G. W. N. Yost.
Harvester.
Nº 78710. Patented Jun. 9, 1868.
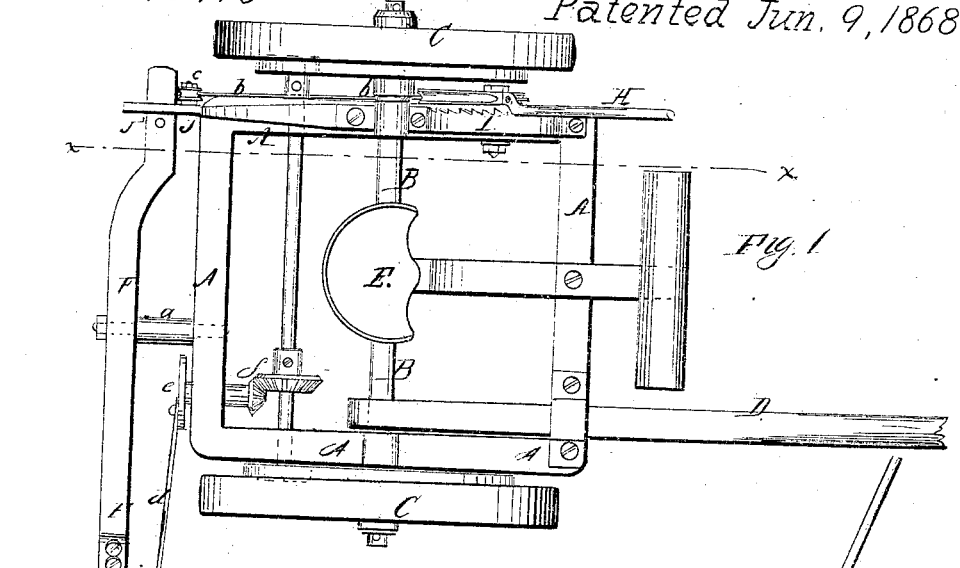
Fig. 1
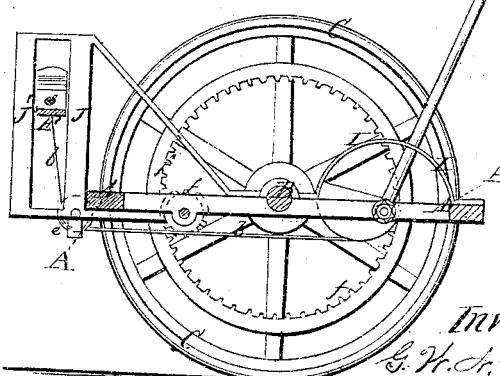
Fig. 2  Fig. 3
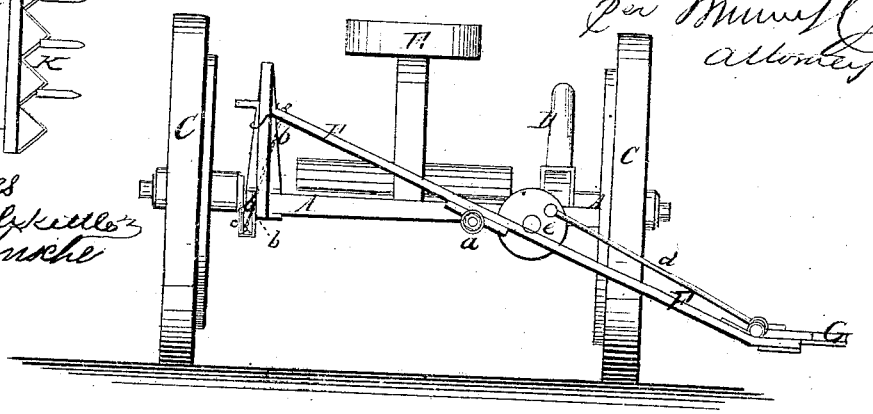
Witnesses
Inventor
G. W. N. Yost
per Munn & Co
Attorneys

United States Patent Office.

G. W. N. YOST, OF CORRY, PENNSYLVANIA, ASSIGNOR TO CORRY MACHINE COMPANY, OF SAME PLACE.

Letters Patent No. 78,710, dated June 9, 1868.

IMPROVEMENT IN HARVESTERS.

The Schedule referred to in these Letters Patent and making part of the same.

TO ALL WHOM IT MAY CONCERN:

Be it known that I, G. W. N. YOST, of Corry, in the county of Erie, and State of Pennsylvania, have invented a new and improved Combined Mower and Reaper; and I do hereby declare that the following is a full, clear, and exact description thereof, which will enable others skilled in the art to make and use the same, reference being had to the accompanying drawings, forming part of this specification, in which—

Figure 1 represents a plan or top view of my improved mower and reaper.

Figure 2 is a rear elevation of the same.

Figure 3 is a vertical sectional view of the same, the plane of section being indicated by the line $x$ $x$, fig. 1.

Similar letters of reference indicate corresponding parts.

This invention relates to a new mower and reaper which is so arranged that the finger-bar and its appendages can be easily raised over obstructions while mowing, and can be held in an elevated position for reaping, the finger-bar being held steady, and prevented from lateral motion by a guide, in which the finger-bar holder plays up and down.

The invention consists in hinging the finger-bar to a holder, which is by a horizontal pin pivoted to the frame of the machine, and which at its free end, is by means of a rope or chain passing over friction-rollers, connected with a lever for raising and lowering the finger-bar. The lever can be locked in a curved ratchet-plate, so as to hold the finger-bar at any desired height. The free end of the finger-bar holder plays between two vertical standards which project from the frame, and the lever is thus prevented from being moved horizontally by the strain on the finger-bar, and the pin by which the holder is pivoted to the frame is thus protected from being exposed to undue strain. A holder is thus produced, which, although its end can be moved up and down, will still be a very secure support for the finger-bar, and will not work loose on the pin by which it is pivoted to the frame of the machine.

A represents the frame of my improved mowing and reaping-machine. The same is made of wood or metal, of suitable shape and size. B is the main axle; C C, the driving-wheels; D, the pole; E, the driver's seat. All these parts are of suitable or ordinary construction.

To the rear edge of the frame A, by means of a horizontal pin, $a$, is pivoted a bar, F, to one end of which the finger-bar G is hinged, while its outer end is, by means of a cord or chain, $b$, which passes over friction rollers $c$ $c$, as shown in fig. 3, connected with the lower end of a lever, H, that is pivoted to the side of the frame, within convenient reach of the driver. It will be seen that by turning the lever H, the free end of the bar F can be pulled down, in which case the finger-bar would be elevated, and can be lowered when the cord is slackened, in which case the finger-bar will be lowered by its own weight. The lever H can be locked in a toothed curved plate, I, or its equivalent, so as to retain the finger-bar at any desired elevation. The free end of the lever F, that is, that end which is connected with the lever H, fits between two upright bars J and J', which project from the frame A, and which prevent lateral play of the bar F, so that the finger-bar is hinged to a steady, strong holder, which will not be moved by the pressure against the front or rear edge of the finger-bar, and so that the pin $a$ will not be straightened, and the connection injured.

The cutter-bar K is held in the finger-bar, and is connected, by means of a rod, $d$, with the pitman-wheel $e$, which receives motion by means of suitable gearing $f$ from the driving-shaft B.

Having thus described my invention, what I claim as new, and desire to secure by Letters Patent, is—

The described combination with each other of the finger-bar G, finger-bar holder F, pivot $a$, posts J and J', cord or chain $b$, and lever H, all made and operating substantially as and for the purpose herein shown and described.

G. W. N. YOST.

Witnesses:
WM. F. McNAMARA,
ALEX. F. ROBERTS.